(12) United States Patent
Ryu et al.

(10) Patent No.: US 8,547,914 B2
(45) Date of Patent: Oct. 1, 2013

(54) METHOD FOR TRANSMITTING PACKET DOWNLINK ACK/NACK INFORMATION IN A WIRELESS COMMUNICATION SYSTEM AND APPARATUS FOR THE SAME

(75) Inventors: Jin Sook Ryu, Anyang-si (KR); Yung Mi Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 12/817,859

(22) Filed: Jun. 17, 2010

(65) Prior Publication Data

US 2011/0007697 A1 Jan. 13, 2011

Related U.S. Application Data

(60) Provisional application No. 61/218,070, filed on Jun. 18, 2009.

(51) Int. Cl.
*H04W 4/00* (2009.01)
*H04J 3/00* (2006.01)

(52) U.S. Cl.
USPC .......................................... 370/329; 370/336

(58) Field of Classification Search
None
See application file for complete search history.

(56) References Cited

U.S. PATENT DOCUMENTS

| 2005/0201319 | A1 | 9/2005 | Lee et al. | |
|---|---|---|---|---|
| 2009/0086685 | A1* | 4/2009 | Aghili et al. | 370/336 |
| 2010/0265886 | A1* | 10/2010 | Hole et al. | 370/328 |
| 2010/0303035 | A1* | 12/2010 | Gao et al. | 370/329 |

OTHER PUBLICATIONS

Nokia et al., 3GPP TSG-GERAN Meeting #33bis G2-070087:Introduction of Fast Ack/Nack Reporting, dated Mar. 2007, all pages.*

* cited by examiner

*Primary Examiner* — Chirag Shah
*Assistant Examiner* — Srinivasa Reddivalam
(74) *Attorney, Agent, or Firm* — McKenna Long & Aldridge LLP

(57) ABSTRACT

Various methods and apparatuses for transmitting packet downlink ACK/NACK information in a wireless communication are disclosed. A method of transmitting ACK/NACK information in Fast ACK/NACK reporting (FANR) mode in a wireless communication system is presented. The method comprises receiving a command from the network to operate in FANR mode, determining the ACK/NACK state for a number of uplink data blocks, transmitting an ACK/NACK signal for a downlink data block in an uplink control message, if it was determined that the ACK/NACK state is not an ACK state for at least a predetermined number of uplink data blocks.

16 Claims, 7 Drawing Sheets

FIG. 3

| RLC/MAC block |||||| 
|---|---|---|---|---|---|
| RLC/MAC header | RLC data block 1 | RLC data block 2 (conditional) | RLC data block 3 (conditional) | RLC data block 4 (conditional) | ACK/NACK info. |

FIG. 4

| Bit | | | | | | | | Octet |
|---|---|---|---|---|---|---|---|---|
| 8 | 7 | 6 | 5 | 4 | 3 | 2 | 1 | |
| TFI | PANI | CES/P ||| USF ||| 1 |
| BSN1 || PR || TFI |||| 2 |
| BSN1 ||||||||  3 |
| BSN2 ||||||| BSN1 | 4 |
| CPS ||||| BSN2 ||| 5 |

METHOD FOR TRANSMITTING PACKET DOWNLINK ACK/NACK INFORMATION IN A WIRELESS COMMUNICATION SYSTEM AND APPARATUS FOR THE SAME

Pursuant to 35 U.S.C. §119(e), this application claims the benefit of priority to Provisional Application No. 61/218,070, filed on Jun. 17, 2009, the contents of which are incorporated by reference herein in their entirety.

TECHNICAL FIELD

The present invention relates to a wireless communication system, and more particularly, to a method for transmitting packet downlink ACK/NACK information in a wireless communication system and an apparatus through which the method can be carried out.

BACKGROUND ART

Global System for Mobile communication (GSM) is a radio technology which has been developed as a standardized system for radio communication systems in Europe and which has widely been deployed all over the world. General Packet Radio Service (GPRS) was introduced to provide packet switched data services in circuit switched data services provided by the GSM. The Enhanced Data rate for GSM Evolution (EDGE) employs an 8-Phase Shift Keying (PSK) in addition to the Gaussian Minimum Shift Keying (GMSK) employed in the GSM. The Enhanced General Packet Radio Service (EGPRS) represents the GPRS using the EDGE.

A Packet Data CHannel (PDCH) denotes a physical channel used for GPRS/EGPRS traffic. Examples of logical channels mapped onto the PDCH include a Packet Common Control CHannel (PCCCH) used for control signals required in packet transmission initialization, a Packet Data Traffic CHannel (PDTCH) for user data, a Packet Associated Control CHannel (PACCH) for dedicated signalling, and so on.

An Enhanced General Packet Radio Service phase 2 (EGPRS2) supporting further various modulation and coding schemes has recently being developed. While the EGPRS supports only two modulation schemes (i.e., GMSK and 8-PSK), the EGPRS2 supports five modulation schemes (i.e., GMSK, Quadrature Phase Shift Keying (QPSK), 8-PSK, 16-quadrature amplitude modulation (QAM), and 32-QAM). There are two levels of EGPRS2, that is, EGPRS2-A and EGPRS2-B. The EGPRS2-A supports the GMSK, 8-PSK, 16-QAM and 32-QAM. The EGPRS2-B supports the GMSK, QPSK, 16-QAM and 32-QAM. A downlink EGPRS2-A uses modulation schemes MCS-1 to MCS-4 (MCS stands for Modulation and Coding Scheme) and DAS-5 to DAS-12 (DAS stands for Downlink level A modulation and coding Scheme). An uplink EGPRS2-A uses modulation schemes MCS-1 to MCS-6 and UAS-7 to UAS-11 (UAS stands for Uplink level A modulation and coding Scheme). A downlink EGPRS2-B uses modulation schemes MCS-1 to MCS-4 and DBS-5 to DBS-12 (DBS stands for Downlink level B modulation and coding Scheme). An uplink EGPRS2-B uses modulation schemes MCS-1 to MCS-4 and UBS-5 to UBS-12 (UBS stands for Uplink level B modulation and coding Scheme). A modulation and coding scheme for each level in the EGPRS2 may be found in 3GPP TS 43.064.

Hereinafter, an EGPRS system is a system to support EGPRS or both EGPRS and EGPRS2.

An EGPRS system provides a multi-data rate by using various modulation and coding schemes. For example, data is transmitted with various data rates through the PDTCH. The data rate is adjusted on the basis of the link quality in a link adaptation process. If the link quality is good, data is transmitted with a high data rate. On the contrary, if the link quality is poor, data is transmitted with a low data rate. Data may be lost when transmitted according to a modulation and coding scheme that requires a data rate higher than achievable with the link quality. In link adaptation, a data throughput is increased using the highest possible data rate by using a specific modulation and coding scheme with a predetermined link quality.

In the EGPRS system, link adaptation is performed by a Radio Link Control (RLC)/Medium Access Control (MAC) layer. The RLC layer and the MAC layer are respectively located in a Mobile Station (MS) and a Base Station (BS). Protocol Data Units (PDUs) of the RLC layer are delivered to an RLC entity, and are split in an RLC/MAC block unit by the RLC entity. Thereafter, communication is achieved in an RLC/MAC block unit. Each RLC/MAC block is numbered by a Block Sequence Number (BSN). The BSN is used to modify an erroneous block by tracking an RLC/MAC block between a receiving RLC/MAC entity and a transmitting RLC/MAC entity. In downlink transmission, the BS requests the MS to send a status of a received block, and the MS transmits a packet downlink ACKnowledgment/Negative-ACKnowledgment (ACK/NACK) message in response thereto. In uplink transmission, the MS does not directly request the BS to send a status of a received block, the MS transmits Stall IndTicator (SI) informing whether the Transmit Window is stalled or not.

Processes used in the MAC/RLC layer are disclosed in 3GPP TS 44.060 V8.5.0 (2009-05). 3GPP TS 44.060 discloses an uplink RLC/MAC header and a downlink RLC/MAC header for various MCSs. Among fields included in the header, an Uplink State Flag (USF) indicates an owner or usage of a next uplink radio block in the same timeslot. A Relative Reserved Block Period (RRBP) field specifies a single uplink block in which the MS transmits a packet control acknowledgment message of a Packet Associated Control Channel (PACCH) block through a network. An EGPRS Supplementary/Polling (ES/P) field indicates an effectiveness or non-effectiveness of the RRBP field.

As a part of EGPRS evolution, latency reduction is proposed. The latency reduction includes two methods, i.e., Reduced Transmission Time Interval (RTTI) configuration and Fast ACK/NACK Reporting (FANR). According to the RTTI configuration, a radio block is transmitted through a PDCH-pair to reduce a period for transmitting one radio block to 10 ms from 20 ms which is required in the conventional Basic Transmission Time Interval (BTTI) configuration. According to the FANR, ACK/NACK information is piggy-backed on a radio block without having to transmitting ACK/NACK by using an additional message. Thus, the ACK/NACK can be transmitted and received without additional message assignment.

FANR activation is included in transmission when a downlink assignment message or an uplink assignment message is assigned to the MS by the network. When the FANR activation is instructed, the MS performs uplink transmission or downlink transmission by using the FANR.

An MS supporting the latency reduction can be assigned with a Temporary Block Flow (TBF) for which FANR is activated in the RTTI configuration or the BTTI configuration. If the MS is assigned with the TBF for which FANR is activated, the network activates FANR for all concurrent TBFs assigned to the MS. This implies that the FANR is activated or inactivated for the all concurrent TBFs. Further, the network may individually instruct activation/inactivation of the FANR when the uplink TBF and the downlink TBF are concurrently allocated or reallocated.

According to the FANR, PAN (Piggy-backed ACK/NACK) field is inserted into TBF and transmitted as ACK/NACK information for the received RLC data block (e.g. PAN field including ACK/NACK information for the downlink TBF is inserted into uplink TBF and transmitted).

Acknowledge state array (V(B)) is an array of Sequence Number Space (SNS) elements indicating the acknowledgement status of Window Size (WS) previous RLC data blocks. The array is indexed relative to the acknowledge state variable V(A) modulo SNS. The values of V(B) shall be updated from the values received from its peer in the reported bitmap (RB) of the Packet ACK/NACK message. V(B) may have value of ACKED, NACKED, PENDING_ACK or TENTATIVE_ACK.

DISCLOSURE

Technical Problem

When ACK information is received using PAN field (i.e. RBB (Received Block Bitmap) or RB includes '1' for PAN field), V(B) is changed to TENTATIVE_ACK state, V(A) is not increased, and Transmit Window is not advanced to higher BSN. Accordingly, when Transmit Window is stalled and ACK information is received using PAN field, Transmit Window is not advanced and stays stilled stall. In this case, conventional PACKET ACK/NACK message (e.g. PACKET UPLINK ACK/NACK message, EGPRS PACKET DOWNLINK ACK/NACK message, and EGPRS PACKET DOWNLINK ACK/NACK TYPE2 message) should be transmitted. Therefore, Transmit Window may be stalled frequently and transmission latency can be increased.

Accordingly, the present invention is directed to a method and an apparatus for transmitting packet downlink ACK/NACK information, which substantially obviates one or more problems due to limitations and disadvantages of the related art.

An object of the present invention is to provide method and apparatus for fast and efficient operation of downlink TBF.

Another object of the present invention is to provide method and apparatus for reducing waste of uplink resource.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, the present invention discloses a method and an apparatus for prioritizing operation in Relay Node.

In a first aspect of the present invention, a method of transmitting ACK/NACK information in Fast ACK/NACK reporting (FANR) mode in a wireless communication system is presented. The method comprises receiving a command from the network to operate in FANR mode, determining the ACK/NACK state for a number of uplink data blocks, transmitting an ACK/NACK signal for a downlink data block in an uplink control message, if it was determined that the ACK/NACK state is not an ACK state for at least a predetermined number of uplink data blocks.

In one feature, the ACK/NACK state of one or more of the predetermined number of uplink data blocks is a tentative ACK state.

In another feature, the ACK/NACK state for all of the predetermined number of uplink data blocks is a tentative ACK state.

In still another feature, the method further comprises transmitting an ACK/NACK signal for the downlink data block in an uplink data block, if it was determined that the ACK/NACK state is not an ACK state for less than the predetermined number of uplink data blocks.

In still another feature, transmitting the ACK/NACK signal for the downlink data block in the uplink data block comprises transmitting the ACK/NACK signal for the downlink data block in a "piggyback" ACK/NACK field of the uplink data block.

In still another feature, the uplink data blocks and downlink data block are Radio Link Control data blocks.

In still another feature, the method further comprises receiving a polling message from the network requesting the transmission of ACK/NACK information, and transmitting the ACK/NACK signal for the downlink data block in the uplink control message in response to the polling message.

In still another feature, the method further comprises receiving a downlink data block, detecting an unreported ACK/NACK state for the downlink data block, and transmitting the ACK/NACK signal for the downlink data block in the uplink control message in response to the unreported ACK/NACK state.

In still another feature, the uplink control message is an EGPRS Packet Downlink ACK/NACK message.

In still another feature, the uplink control message is an EGPRS Packet Downlink ACK/NACK Type 2 message.

In a second aspect of the present invention, a method of transmitting ACK/NACK information in Fast ACK/NACK reporting (FANR) mode in a wireless communication system is presented. The method comprises determining the ACK/NACK state for a number of transmitted data blocks, and transmitting an ACK/NACK signal for a received data block in an uplink control message, if it was determined that the ACK/NACK state is a tentative ACK state for at least a predetermined number of transmitted data blocks.

In one feature, the method further comprises transmitting an ACK/NACK signal for the received data block in a pierced data block, if it was determined that the ACK/NACK state is a tentative ACK state for less than the predetermined number of transmitted data blocks.

In another feature, transmitting the ACK/NACK signal for the received data block in the pierced data block comprises transmitting the ACK/NACK signal for the received data block in a "piggyback" ACK/NACK field of the pierced data block.

In a third aspect of the present invention, a mobile station capable of operating in Fast ACK/NACK reporting (FANR) mode in a wireless communication system is presented. The mobile station comprises a receive module configured for receiving a command from the network instructing the mobile station to operate in FANR mode, a processor configured to determine the ACK/NACK state for a number of uplink data blocks, and a transmit module for transmitting an ACK/NACK signal for a downlink data block in an uplink control message, if the processor determines that the ACK/NACK state is not an ACK state for at least a predetermined number of uplink data blocks.

In one feature, the transmit module is further configured for transmitting an ACK/NACK signal for a downlink data block in an uplink control message, if the processor determines that the ACK/NACK state of one or more of the predetermined number of uplink data blocks is a tentative ACK state.

In another feature, the transmit module is further configured for transmitting an ACK/NACK signal for a downlink data block in an uplink control message, if the processor determines that the ACK/NACK state for all of the predetermined number of uplink data blocks is a tentative ACK state.

17. The mobile station of claim 14, wherein the transmit module is further configured to transmit an ACK/NACK signal for the downlink data block in an uplink data block, if the processor determines that the ACK/NACK state is not an ACK state for less than the predetermined number of uplink data blocks.

In still another feature, the transmit module is further configured to transmit the ACK/NACK signal for the downlink data block in a "piggyback" ACK/NACK field of the uplink data block, if the processor determines that the ACK/NACK state is not an ACK state for less than the predetermined number of uplink data blocks.

In still another feature, the uplink data blocks and downlink data block are Radio Link Control data blocks.

In still another feature, the receive module is further configured to receive a polling message from the network requesting the transmission of ACK/NACK information; and the transmit module is further configured to transmit the ACK/NACK signal for the downlink data block in the uplink control message in response to the polling message.

In still another feature, the receive module is further configured to receive a downlink data block; the processor is further configured to detect an unreported ACK/NACK state for the downlink data block; and the transmit module is further configured to transmit the ACK/NACK signal for the downlink data block in the uplink control message in response to the unreported ACK/NACK state.

In still another feature, the uplink control message is an EGPRS Packet Downlink ACK/NACK message.

In still another feature, the uplink control message is an EGPRS Packet Downlink ACK/NACK Type 2 message.

It is to be understood that both the foregoing general description and the following detailed description of the present invention are exemplary and explanatory and are intended to provide further explanation of the invention as claimed.

ADVANTAGEOUS EFFECTS

According to the embodiments of the present invention, the following advantages can be obtained. Fast and efficient operation of downlink TBF can be achieved and waste of resource can be reduced.

It is to be understood that the effects that can be obtained by the present invention are not limited to the aforementioned effects, and another effects, which are not described, will be apparent to those with ordinary skill in the art to which the present invention pertains, from the following detailed description of the present invention. Namely, effects which are not intended in the embodiments of the present invention can be derived from the embodiments of the present invention by those with ordinary skill in the art.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a diagram showing another example of a data block.

FIG. 4 is a diagram showing an example of an RLC/MAC header for the support of FANR.

BEST MODE

Figure 1:
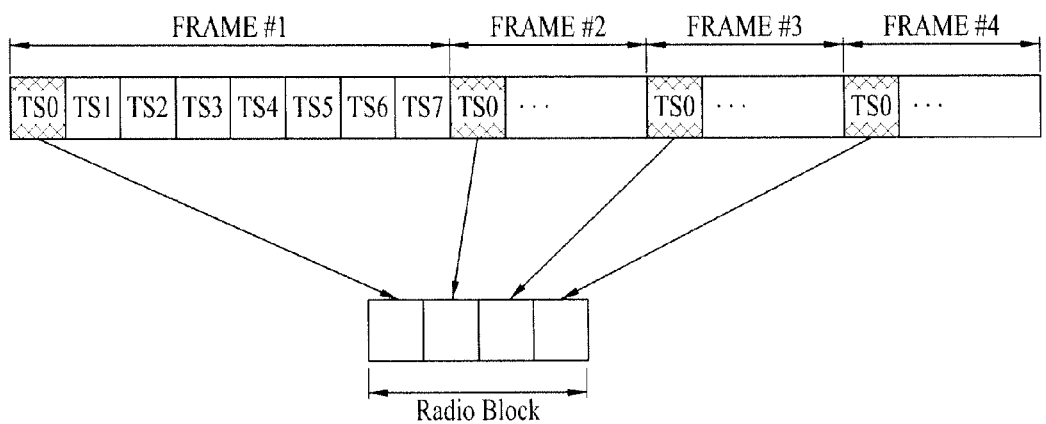
FIG. 1 is a diagram showing the concept of a radio block.

Reference will now be made in detail to the preferred embodiments of the present invention, examples of which are illustrated in the accompanying drawings. Wherever possible, the same reference numbers will be used throughout the drawings to refer to the same or like parts.

Hereinafter, the embodiments of the present invention disclose methods and apparatus for prioritizing operation in RN.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of the drawings, procedures or steps that may make the subject matter of the present invention obscure will be omitted, and procedures or steps that can be understood by the person with ordinary skill in the art will be omitted. However, it will be apparent that procedures or steps which are not illustrated can be predicted by those skilled in the art within an apparent range.

The embodiments of the present invention have been described based on the signal transmission and reception between a base station and a mobile station.

In this case, the base station means a terminal node (TN) of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes (NNs) along with the base station may be performed by the base station or network nodes other than the base station. The term of the base station may be replaced with one of terms such as a fixed station, Node B, eNode B (eNB), an advanced base station (ABS) and access point. The term of the mobile station may be replaced with one of terms such as a user equipment (UE), a subscriber station (SS), a mobile subscriber station (MSS), a mobile terminal (MS), an advanced mobile station (AMS) and a terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

The embodiments of the present invention can be supported by standard documents disclosed in at least one of wireless access systems, i.e., IEEE 802.xx system, 3GPP system, 3GPP LTE(Long Term Evolution) system, 3GPP LTE-A (LTE-Advanced) system, 3GPP2 system and 3GPP GERAN(GSM/EDGE Radio Access Network) system. Namely, among the embodiments of the present invention, apparent steps or parts which are not described can be described with reference to the above standard documents.

Also, all terminologies disclosed herein can be described by the above standard documents. Particularly, the embodiments of the present invention can be supported by one or more of standard documents of 3GPP GERAN system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Specific terminologies hereinafter used in the embodiments of the present invention are provided to assist understanding of the present invention, and various modifications can be made in the specific terminologies within the range that they do not depart from technical spirits of the present invention.

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). For clarity, this application focuses on the 3GPP GERAN. However, technical features of the present invention are not limited thereto.

FIG. 1 is a diagram showing the concept of a radio block. The radio block is a basic unit used for transfer of one data block. The radio block is transmitted through a packet data channel (PDCH).

Referring to FIG. 1, one TDMA frame consists of 8 timeslots TS0, TS1, . . . , and TS7 in an EGPRS system. The radio block consists of 4 consecutive timeslots belonging to different frames. For example, the radio block can be configured by taking first timeslots TS0 one by one from the 4 consecutive frames. Although the first timeslot TS0 is taken herein, it is also possible to take another timeslot.

According to the structure of FIG. 1, one radio block is transmitted during 4 transmission time intervals (TTIs). 1 TTI is a time for transmitting one frame.

The radio block can be transmitted through two PDCHs, and the two PDCHs are referred to as one PDCH-pair. This is referred to as a reduced transmission time interval (RTTI) configuration, whereas the structure of FIG. 1 is referred to as a basis transmission time interval (BTTI) configuration. In the RTTI configuration, the radio block is transmitted through two consecutive 2 PDCHs in one frame. Therefore, one radio block is transmitted for 2 TTIs.

A channel, i.e. a timeslot sequence, uses the same timeslot number in every TDMA frame and is defined by a timeslot number and a TDMA frame number sequence. A timeslot sequence is regarded as a timeslot unless there is any explicit different explanation in this description.

Transmitting ACK/NACK information in downlink transmission is described as follows.

A TBF is established or reconfigured between a network and an MS. Establishment of the TBF implies that a new TBF is configured. Reconfiguration of the TBF implies that previous TBF configuration is modified. Examples of a message used for establishing or reconfiguring the TBF include a packet downlink assignment message, a packet timeslot reconfigure message, a multiple TBF downlink assignment message, a multiple TBF timeslot reconfiguration message, and so on.

In the process of establishing or reconfiguring the TBF, the network instructs whether fast ACK/NACK reporting (FANR) is used for a given TBF. For example, as shown in Table 1, activation/inactivation of FANR is indicated as a part of an information element (IE) included in the packet downlink assignment message.

TABLE 1

< Packet Downlink Assignment message content > ::=

...

RTTI_DOWNLINK_PDCH_PAIR_ASSIGNMENT_DC : bit (8) >

...

{ 0 | 1      -- '1' indicates Fast Ack/Nack Reporting is activated
        < EVENT_BASED_FANR: bit (1) > }

...

An 'EVENT_BASED_FANR' field indicates whether event-based FANR is used. The network appends an FANR activation field to a message transmitted to the MS in the process of establishing or reconfiguring the TBF. The FANR activation field indicates whether to append ACK/NACK information to a data block. The data block denotes a block transmitted using a radio block. In the following description, the data block is assumed to be an RLC/MAC block exchanged between RLC/MAC entities.

The network transmits a downlink RLC/MAC block. When FANR is activated for an allocated TBF, the MS reports a reception status of a downlink data block (i.e., RLC/MAC block) to a BS by using ACK/NACK information included in an uplink data block.

The ACK/NACK information included in the uplink data block indicates the reception status of the downlink RLC/MAC block. The ACK/NACK information may include a success or failure of decoding of at least one RLC data block included in the downlink RLC/MAC block or a success or failure of decoding of an RLC/MAC header. The ACK/NACK information may consist of 1 bit or 2 bits or more bits, and the number of bits is not limited thereto.

When FANR is activated, a reception status of a data block for a TBF allocated in one direction is transmitted by being included in a data block transmitted in another direction. In the BTTI configuration, 4 TTIs are required to transmit one radio block, and more TTIs may be required to transmit the reception status by using an additional message. When the reception status of the downlink data block is evaluated using the ACK/NACK information included in the uplink data block, a message for transmitting additional ACK/NACK information is not required. In addition, whether the ACK/NACK information is included in the data block is indicated in a process of configuring a TBF, and thus signaling is not required to indicate transmitting and/or receiving of additional ACK/NACK information for the TBF.

Transmitting ACK/NACK information in uplink transmission is similar to the above described transmitting ACK/NACK information in downlink transmission. For example, when the MS transmits an uplink RLC/MAC block FANR is activated for an allocated TBF, the BS reports a reception status of an uplink data block to a MS by using ACK/NACK information included in a downlink data block. The ACK/NACK information included in the downlink data block indicates the reception status of the uplink RLC/MAC block.

Figure 2:
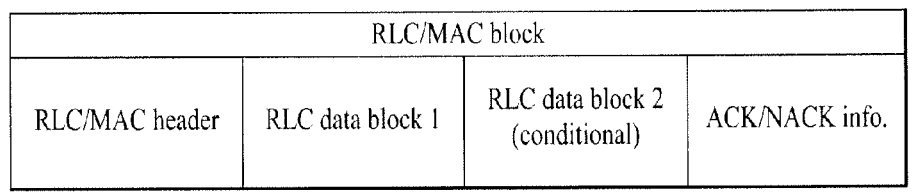
FIG. 2 is a diagram showing an example of a data block.

FIG. 2 shows an example of a data block. An RLC/MAC block includes an RLC/MAC header, at least one RLC data block, and ACK/NACK information. The RLC data block includes at least one higher-layer PDU. The RLC/MAC header indicates whether information on the RLC data block or the ACK/NACK information is included.

FIG. 3 shows another example of a data block. An RLC/MAC block of FIG. 3 includes up to 4 RLC data blocks and also includes ACK/NACK information.

FIG. 4 shows an example of an RLC/MAC header for the support of FANR.

Referring to FIG. 4, the RLC/MAC header includes a TFI field, a PANI field, an uplink state flag (USF) field, and so on. The TFI field identifies a TBF to which an RLC data block belongs. The USF indicates an owner or usage of a next uplink radio block in the same timeslot. A power reduction (PR) field indicates power level reduction of a current RLC/MAC block. For a block sequence number (BSN) field of the present embodiment, 2 RLC data blocks, i.e., BSN1 and BSN 2, exist in the RLC/MAC block. The BSN2 is a relative value with respect to the BSN1. A combined EGPRS supplementary/polling (CES/P) field indicates which field is included in a next uplink radio block reserved by the CES/P field. A coding and puncturing scheme indicator (CPS) field indicates a type of puncturing and channel coding used in data blocks.

The PANI field indicates whether piggy-backed ACK/NACK information exists in a received downlink RLC/MAC data block. That is, the network first searches for the PANI field from an RLC/MAC header of a received uplink RLC/MAC block. If the PANI field indicates that the piggy-backed ACK/NACK (PAN) information exists in the RLC/MAC data block, the network recognizes that the PAN information exists in the received RLC/MAC data block, and then performs channel decoding in a format in which a PAN field is inserted.

Figure 5:
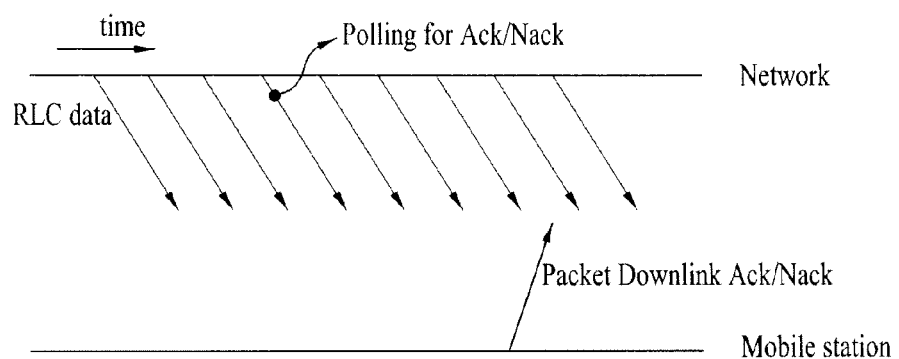
FIG. 5 is a diagram showing transmission of downlink RLC data block and Packet Downlink ACK/NACK message.

FIG. 5 is a diagram showing transmission of downlink RLC data block and Packet Downlink ACK/NACK message.

Referring to FIG. 5, when Mobile Station (MS) is assigned downlink TBF as EGPRS TBF or EGPRS2 TBF and receive downlink RLC data block, MS transmits to Network ACK/NACK information indicating whether downlink RLC data is received. Using the ACK/NACK information received from the MS, the Network either retransmit the RLC data block or transmit new RLC data block by advancing Transmit Window. MS is periodically polled by the Network for ACK/NACK information, MS transmits Packet Downlink ACK/NACK message by received polling information. Examples of Packet Downlink ACK/NACK message are EGPRS PACKET DOWNLINK ACK/NACK message and EGPRS PACKET DOWNLINK ACK/NACK TYPE2 message.

Figure 6:
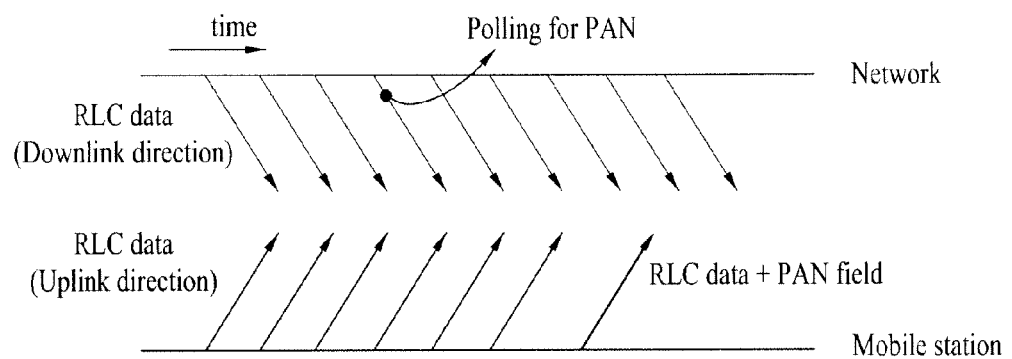
FIG. 6 is a diagram showing transmission uplink RLC data block including PAN field by Polling scheme.
Figure 7:
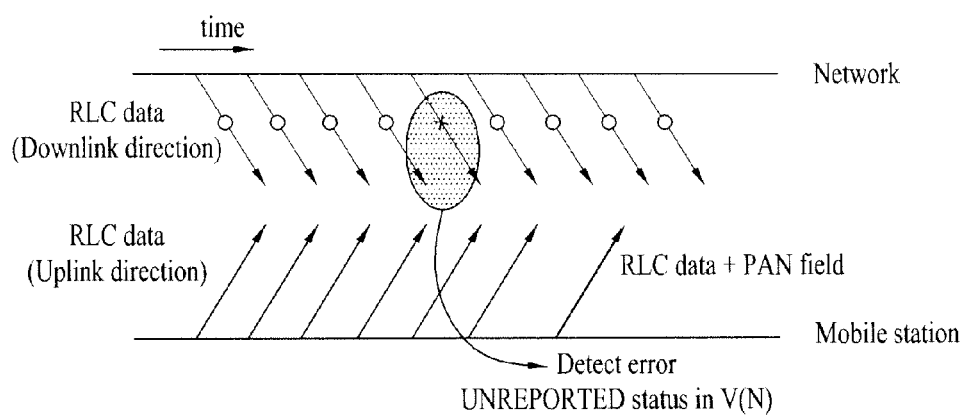
FIG. 7 is a diagram showing transmission of uplink RLC data block including PAN field by Event-based scheme.

FIG. 6 and FIG. 7 are diagrams showing transmission of downlink RLC data block and uplink RLC data block including PAN field.

Referring to FIGS. 6 and 7, ACK/NACK information is transmitted to Network not using an independent control message (Packet Downlink ACK/NACK message), PAN field including the ACK/NACK information for the downlink TBF is inserted into uplink TBF and transmitted to the Network.

FIG. 6 is a diagram showing transmission of downlink RLC data block and uplink RLC data block including PAN field by Polling scheme.

Referring to FIG. 6, MS is polled for a PAN by Network. MS inserts PAN field into available uplink TBF and transmits the uplink TBF to Network.

FIG. 7 is a diagram showing transmission of downlink RLC data block and uplink RLC data block including PAN field by Event-based scheme.

When MS receives downlink RLC data block, UNREPORTED state may occur in Receive State Array (V(N)) of the downlink RLC data block. If such an error is detected, MS inserts PAN field including ACK/NACK information for the downlink TBF into RLC data block of uplink TBF being transmitted, regardless of Network's command.

Figure 8:
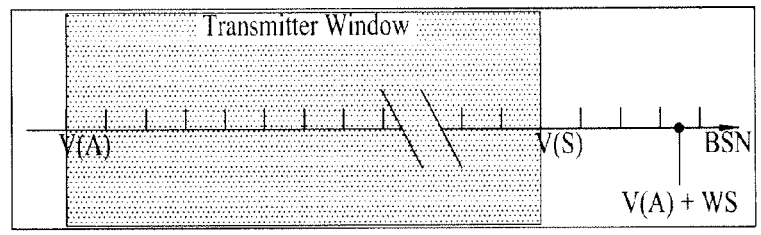
FIG. 8 is a diagram showing operation of Transmit Window.

FIG. 8 is a diagram showing operation of Transmit Window.

When sending side (e.g. MS) receives ACK/NACK information from receiving side (e.g. Network), sending side operates Transmit Window.

Description of the terms used in FIG. 8 is as in Table 2.

TABLE 2

| | Description |
|---|---|
| (A) | Acknowledge state variable<br>BSN value of the oldest RLC data block<br>that has not been positively acknowledged |
| (S) | Send state variable<br>Sequence number of the next in-sequence<br>RLC data block to be transmitted |
| (B) | Acknowledge state array<br>Array which has the<br>acknowledge/unacknowledged state of corresponding<br>BSN value |
| SN | Block Sequence Number |

Sending side operates Transmit Window by updating two variables (V(A) and V(S)) and an array (V(B)) using ACK/NACK information received from receiving side. Details are described below.

Each RLC endpoint transmitter has an associated acknowledge state array (V(B)). V(B) is an array of Sequence Number Space (SNS) elements indicating the acknowledgement status of Window Size (WS) previous RLC data blocks. The array is indexed relative to the acknowledge state variable V(A) modulo SNS. The values of V(B) are updated from the values received from its peer in the Reported Bitmap (RB) of the ACK/NACK information.

The transmitter transmits the oldest RLC data block whose corresponding element in V(B) indexed relative to V(A) has the value NACKED. As each RLC data block is transmitted the corresponding element in V(B) is set to the value PENDING_ACK. If the RLC data block to be transmitted is split over two radio blocks, both radio blocks shall be transmitted. On initial transmission the RLC data blocks are sent with one of the initial code rates (the rate 1/3 encoded data is punctured with Puncturing Scheme (PS) 1 of the selected Modulation and Coding Scheme MCS) and if the RLC data block is required to be retransmitted it is sent with PS 2 of the selected MCS. On subsequent retransmissions the RLC data block is transmitted with PS in a cyclic process.

If [V(S)<V(A)+WS] modulo SNS and no RLC data blocks have a corresponding element in V(B) with the value NACKED, the RLC data block with BSN=V(S) is transmitted and the corresponding element in V(B) is set to the value PENDING_ACK. If the transmitter is the mobile station, the pre-emptive transmission bit is set to '1' in the PACKET UPLINK ACK/NACK message and there are no further RLC data blocks available for transmission (i.e. the RLC data block with BSN=V(S) does not exist), the sending side retransmits the oldest RLC data block whose corresponding element in V(B) has the value PENDING_ACK, then the next oldest block whose corresponding element in V(B) has the value PENDING_ACK, etc. If in this case there are no RLC data blocks whose corresponding element in V(B) has the value PENDING_ACK and either the uplink TBF is not operated in extended uplink TBF mode or the uplink TBF is operated in extended uplink TBF mode but the mobile station shall not refrain from sending an RLC/MAC block (i.e. EXT_UTBF_NODATA is set to '0'), the sending side retransmits the oldest RLC data block whose corresponding element in V(B) has the value TENTATIVE_ACK, then the next oldest block whose corresponding element in V(B) has the value TENTATIVE_ACK, etc. This entire procedure is repeated, starting with the oldest RLC data block whose corresponding element in V(B) has the value PENDING_ACK or has the value TENTATIVE_ACK if no element has the value PENDING_ACK, for as long as the applicable conditions for pre-emptive retransmission are true.

If [V(S)=V(A)+WS] modulo SNS (i.e. the transmit window is stalled), the sending side transmits the oldest RLC data block whose corresponding element in V(B) has the value PENDING_ACK, then the next oldest RLC data block whose corresponding element in V(B) has the value PENDING_ACK, etc. If in this case there are no RLC data blocks whose corresponding element in V(B) has the value PENDING_ACK and either the uplink TBF is not operated in extended uplink TBF mode or the uplink TBF is operated in extended uplink TBF mode but the mobile station does not refrain from sending an RLC/MAC block (i.e. EXT_UTBF_NODATA is set to '0'), the sending side retransmits the oldest RLC data block whose corresponding element in V(B) has the value TENTATIVE_ACK, then the next oldest block whose corresponding element in V(B) has the value TENTATIVE_ACK, etc. This process of retransmitting RLC data blocks whose value in V(B) has the value PENDING_ACK (or TENTATIVE_ACK) is repeated, starting with the oldest RLC data block whose corresponding element in V(B) has the value PENDING_ACK or has the value TENTATIVE_ACK if no element of V(B) has the value PENDING_ACK, as long as equation [V(S)=V(A)+WS]modulo SNS holds. If the transmitter is the mobile station and the pre-emptive transmission bit is set to '0' in the PACKET UPLINK ACK/NACK message the transmitter does not retransmit RLC data blocks whose corresponding element in V(B) has the value PENDING_ACK or TENTATIVE_ACK. When a PACKET UPLINK ACK/NACK message or a PAN field is received the mobile station retransmits the RLC blocks which are set to NACKED in V(B) and new RLC data blocks as far as the transmit window (if advanced) allows. However if the RLC data block is the last in the TBF it is retransmitted even if its state is PENDING_ACK or TENTATIVE_ACK. The default for the mobile side is that the transmitter shall use pre-emptive retransmission. If the transmitter is on the network side this process (pre-emptive retransmission) of retransmitting the oldest RLC data blocks whose value in V(B) has the value PENDING_ACK or TENTATIVE_ACK is optional.

When an element in V(B) falls outside of the active transmit window, i.e. [V(A)≤BSN<V(S)] modulo SNS, the element is set to the value INVALID.

Figure 9:
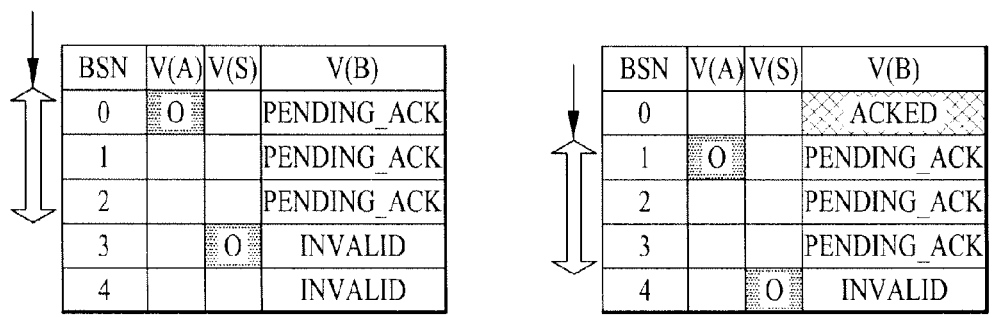
FIG. 9 is a diagram showing Transmit Window operation using PACKET ACK/NACK message.
Figure 10:
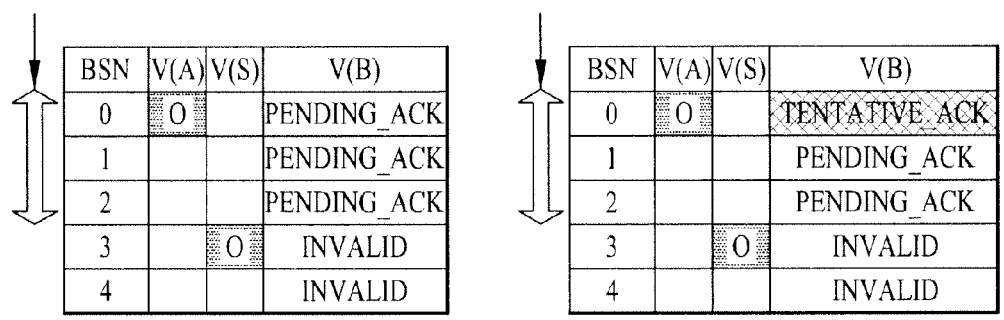
FIG. 10 is a diagram showing Transmit Window operation using PAN field.

FIGS. 9 and 10 are diagrams showing examples of Transmit Window operation.

PACKET ACK/NACK messages (e.g. PACKET UPLINK ACK/NACK message, EGPRS PACKET DOWNLINK ACK/NACK message and EGPRS PACKET DOWNLINK ACK/NACK TYPE2 message) are encoded using CS-1. According to CS-1, 40-bit CRC (Cyclic Redundancy Check) is used. In case of PAN field which is inserted into the place where RLC data block is punctured, 10-bit CRC is used. Since CRC protection level for PAN field is low, when ACK information is received using PAN field, V(B) is changed to TENTATIVE_ACK state not ACK state, V(A) is not increased, and Transmit Window is not advanced to higher BSN. Details are following.

FIG. 9 is a diagram showing Transmit Window operation using PACKET ACK/NACK message.

Assuming Window Size (WS) is 3, MS transmits RLC data corresponding to BSN 0, 1 and 2. After transmitting the RLC data, V(A)=0, V(S)=3, and V(S)=V(A)+WS (i.e. 3=0+3). Thus, MS cannot transmit new RLC data block and wait for ACK/NACK information. That is, the Transmit Window is stalled.

When MS receives EGPRS PACKET UPLINK ACK/NACK message from the Network and finds ACK for BSN=0, the value of V(B) for BSN=0 is changed from PENDING_ACK to ACKED, V(A) is increased to BSN=1, and Transmit Window is advanced. Thus, MS can transmit a new RLC block.

FIG. 10 is a diagram showing Transmit Window operation using PAN field.

Assuming Window Size(WS) is 3, MS transmits RLC data of BSN 0, 1 and 2. After transmitting the RLC data, V(A)=0, V(S)=3, and V(S)=V(A)+WS (i.e. 3=0+3). Thus, MS cannot transmit new RLC data block and wait for ACK/NACK information. That is, the Transmit Window is stalled.

When MS finds ACK for BSN=0 from PAN field in downlink RLC data block, the value of V(B) for BSN=0 is changed from PENDING_ACK to TENTATIVE_ACK but V(A) is not increased. That is Transmit Window is not advanced and stays stalled. In other words, if ACK information for BSN=0 is not received using EGPRS PACKET UPLINK ACK/NACK message, V(A) stays 0 and Transmit window is still stalled.

PENDING_ACK is a state of V(B) that corresponding RLC data block is transmitted in INVALID state or retransmitted in NACKED state. Meanwhile, TENTATIVE_ACK is a state of V(B) that ACK is received using PAN field with low CRC protection level, which is almost ACKED state. RLC data block of TENTATIVE_ACK has lowest transmission order and is not transmitted in some cases.

An RLC data block of TENTATIVE_ACK state almost never retransmitted. According to 3GPP 44.060 V8.5.0 (2009-05), RLC data block of TENTATIVE_ACK state can be transmitted only if there is no RLC data block to be transmitted and PACKET UPLINK DUMMY CONTROL BLOCK is transmitted. Further, if MS can transmit valid data, it is needed that MS can transmit data with valid information instead of RLC data block of TENTATIVE_ACK state.

Meanwhile, in case of using PAN field, ACK/NACK information having amount smaller than conventional PACKET ACK/NACK message (PACKET UPLINK ACK/NACK, EGPRS PACKET DOWNLINK ACK/NACK, and EGPRS PACKET DOWNLINK ACK/NACK TYPE2) can be transmitted/received. Further, even when ACK has been transmitted in PAN field, ACK information should be retransmitted using conventional PACKET ACK/NACK message in order to advance Transmit Window. In these circumstances, Transmit Window stalling may occur frequently.

Figure 11:
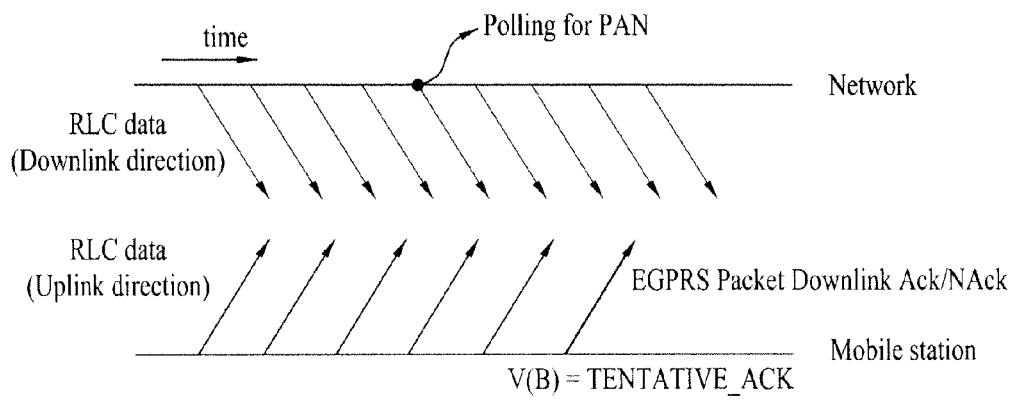
FIG. 11 is a diagram showing transmission of packet downlink ACK/NACK information according to an example of the present invention.

FIG. 11 is a diagram showing transmission of packet downlink ACK/NACK information according to an example of the present invention.

According an example of the present invention, when FANR is activated for MS, MS can transmit EGPRS Packet Downlink ACK/NACK or EGPRS Packet Downlink ACK/NACK Type2 messages without command from Network. When Acknowledge state V(B) is TENTATIVE_ACK for uplink RLC data block to be transmitted, MS may transmit EGPRS Packet Downlink ACK/NACK or EGPRS Packet Downlink ACK/NACK Type2 messages instead of (i.e. prior to) uplink RLC data block including PAN field.

If the MS has been polled for a PAN, and the data blocks specified for transmission all have corresponding elements in V(B) whose value is TENTATIVE_ACK, then no RLC data block is transmitted.

Transmission priority of uplink RLC/MAC blocks is in following order (i.e. (1) is for highest priority and (7) is for the lowest priority):

RLC/MAC control blocks containing a PACKET CS REQUEST message;

RLC/MAC control blocks containing a PACKET CELL CHANGE NOTIFICATION message;

RLC/MAC control blocks except for Packet Uplink Dummy Control Blocks and RLC/MAC control block containing an EGPRS PACKET DOWNLINK ACK/NACK or EGPRS PACKET DOWNLINK ACK/NACK TYPE 2 message when the MS is polled for a PAN;

RLC data blocks (including a PAN field if required) except for RLC data blocks including a PAN which is sent in response to a poll where all the element(s) of V(B) have the value TENTATIVE_ACK;

RLC/MAC control block containing an EGPRS PACKET DOWNLINK ACK/NACK or EGPRS PACKET DOWNLINK ACK/NACK TYPE 2 message when the MS is polled for a PAN;

RLC data block including a PAN field which is sent in response to a poll where all the elements of V(B) have the value TENTATIVE_ACK or ACKED;

RLC/MAC control blocks containing Packet Uplink Dummy Control Blocks.

Referring to FIG. 11, when Acknowledge state V(B) is TENTATIVE_ACK for uplink RLC data block to be transmitted, MS can transmit EGPRS Packet Downlink ACK/NACK or EGPRS Packet Downlink ACK/NACK Type2 messages instead of (prior to) uplink RLC data block including PAN field.

The MS can be configured as Event-based FANR.

Figure 12:
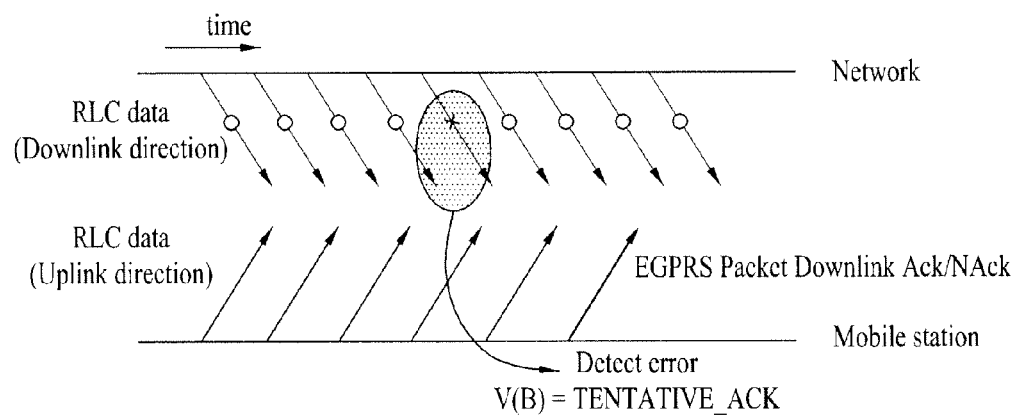
FIG. 12 is a diagram showing transmission of packet downlink ACK/NACK information according to another example of the present invention.

FIG. 12 is a diagram showing transmission of packet downlink ACK/NACK information according to another example of the present invention.

Referring to FIG. 12, Network can command MS to be configured as Event-based FANR and Acknowledge state V(B) is TENTATIVE_ACK for uplink RLC data block to be transmitted when MS detects error in downlink data block, MS can transmit EGPRS Packet Downlink ACK/NACK or EGPRS Packet Downlink ACK/NACK Type2 messages instead of (prior to) uplink RLC data block including PAN field.

According to various examples of the present invention, faster and more efficient operation of downlink TBF can be achieved by transmitting EGPRS Packet Downlink ACK/NACK instead of unnecessary RLC data block for V(B) =TENTATIVE_ACK. EGPRS Packet Downlink ACK/NACK is transmitted instead of PAN, it is possible to transmit larger size of ACK/NACK bitmap. Further, transmitting EGPRS Packet Downlink ACK/NACK or EGPRS Packet Downlink ACK/NACK Type2 message can promptly solve the stalling of Transmit Window of the Network and facilitate rapid reception of new RLC data block by advancing Transmit Window, while using PAN field cannot solve the stalling of Transmit Window of the Network. Moreover, unnecessary waste of uplink resource can be reduced by automatically transmitting EGPRS Packet Downlink ACK/NACK or EGPRS Packet Downlink ACK/NACK Type2 message according to V(B) state of uplink RLC data block.

Hereinafter, an apparatus for implementing the above-described embodiments will be described.

In a wireless communication system, a MS may include a receiving module, a transmitting module, a processor, a memory unit, multiple antennas and the like.

Figure 13:
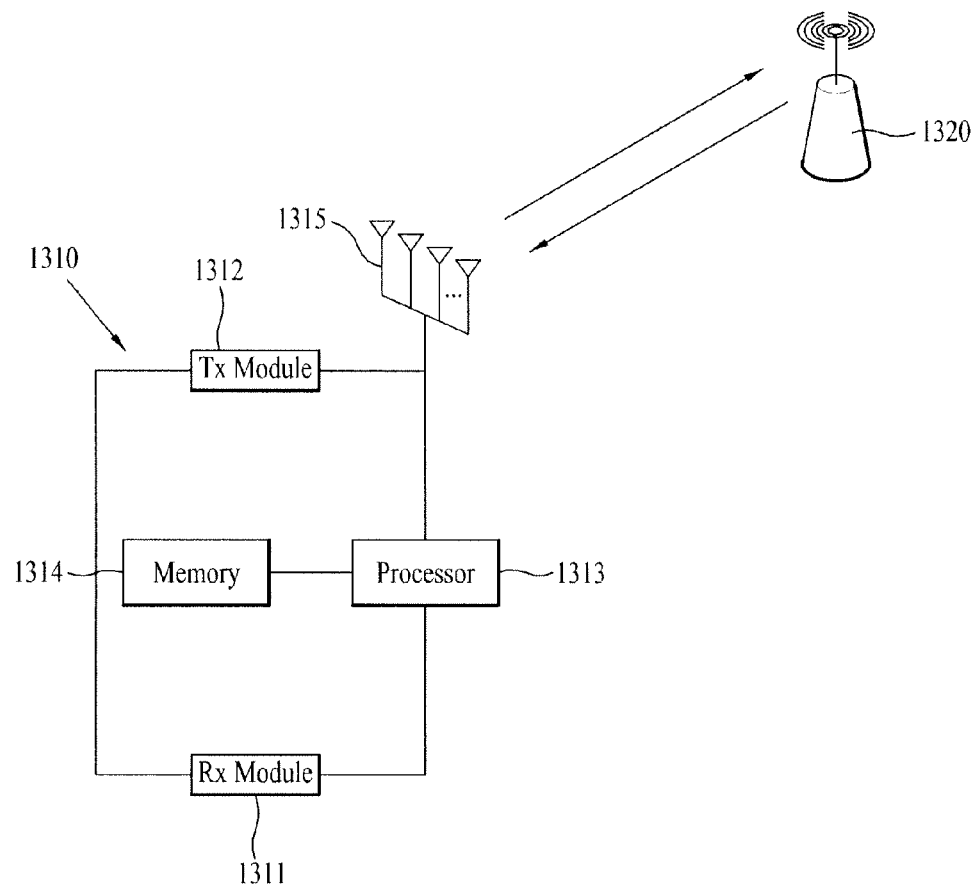
FIG. 13 is a diagram showing the configuration of MS according to an embodiment of the present invention.

FIG. 13 is a diagram showing the configuration of MS according to an embodiment of the present invention.

MS 1310 may comprise a receiving (Rx) module 1311, a transmitting (Tx) module 1312, a processor 1313, a memory unit 1314 and antenna 1315. MS 1310 may be wirelessly connected to Network (BS) 1320. Downlink is a radio link from Network 1320 to MS 1310, and Uplink is a radio link from MS 1310 to Network 1320.

The processor 1313 is communicably connected to other elements (Rx module 1311, a Tx module 1312, a memory unit 1314 and multiple antennas 1315). The processor 1313 may comprise various functional modules.

According an example of the present invention, the processor 1313 may transmit uplink RLC data block to Network 1320 via Tx module 1312, and determine Acknowledge State of the uplink RLC data block to be transmitted. The processor 1313 may determine whether FANR is activated or not. If FANR is activated for the MS and Acknowledge State is TENTATIVE_ACK for the uplink RLC data block, the processor 1313 may transmit EGPRS Packet Downlink ACK/NACK or EGPRS Packet Downlink ACK/NACK Type2 messages instead of uplink RLC data block including PAN field. The processor 1313 may transmit EGPRS Packet Downlink ACK/NACK or EGPRS Packet Downlink ACK/NACK Type2 messages without command from Network 1320.

The memory unit 1314 may store and update information related to MS operation.

Meanwhile, in the present invention, examples of the mobile station include a personal digital assistant (PDA), a cellular phone, a personal communication service (PCS)

phone, a global system for mobile (GSM) phone, a wideband CDMA (WCDMA) phone, and a mobile broadband system (MBS) phone. Moreover, examples of the mobile station include a personal digital assistant (PDA), a hand-held PC, a notebook PC, a smart phone, and a multimode-multiband (MM-MB) terminal.

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiment of the present invention can be implemented by a type of a module, a procedure, or a function, which performs functions or operations described as above. For example, a software code may be stored in a memory unit, and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

[Industrial Applicability]

The embodiments of the present invention can be applied to various wireless communication systems. Example of the various wireless access systems includes 3GPP GERAN system. The embodiments of the present invention can be applied to all technical fields to which the various access systems are applied, as well as the various access systems.

The invention claimed is:

1. In a wireless communication system, a method of transmitting ACK/NACK information in Fast ACK/NACK reporting (FANR) mode, the method comprising:
   receiving a command from a network by a mobile station to operate in event-based FANR mode, wherein the event-based FANR mode is defined as ACK/NACK information for a downlink data block is included in an uplink data block and transmitted if unreported ACK/NACK state for the downlink data block is detected in an instance of not receiving, from the network, a polling message requesting the transmission of ACK/NACK information;
   determining whether there is at least one uplink data block to be transmitted;
   if there is the at least one uplink data block to be transmitted, determining an ACK/NACK state for the at least one uplink data block to be transmitted; and
   if the ACK/NACK state is a tentative ACK state for the at least one uplink data block to be transmitted, transmitting an ACK/NACK signal for the downlink data block in an uplink control message by the mobile station in event-based FANR mode, instead of a transmission of the uplink data block including the ACK/NACK information for the downlink data block.

2. The method of claim 1 further comprising:
   transmitting an ACK/NACK signal for the downlink data block in an uplink data block, if it was determined that the ACK/NACK state is not the tentative ACK state for the at least one uplink data block.

3. The method of claim 2, wherein transmitting the ACK/NACK signal for the downlink data block in the uplink data block comprises:
   transmitting the ACK/NACK signal for the downlink data block in a "piggyback" ACK/NACK field of the uplink data block.

4. The method of claim 1, wherein the at least one uplink data block and downlink data block are Radio Link Control data blocks.

5. The method of claim 1 further comprising:
   receiving the polling message from the network requesting the transmission of ACK/NACK information; and
   transmitting the ACK/NACK signal for the downlink data block in the uplink control message in response to the polling message.

6. The method of claim 1 further comprising:
   receiving the downlink data block;
   detecting the unreported ACK/NACK state for the downlink data block; and
   transmitting the ACK/NACK signal for the downlink data block in the uplink control message in response to the unreported ACK/NACK state instead of a transmission of the uplink data block including the ACK/NACK information for the downlink data block.

7. The method of claim 1, wherein the uplink control message is an EGPRS Packet Downlink ACK/NACK message.

8. The method of claim 7, wherein the uplink control message is an EGPRS Packet Downlink ACK/NACK Type 2 message.

9. In a wireless communication system, a mobile station capable of operating in Fast ACK/NACK reporting (FANR) mode, the mobile station comprising:
   a receive module configured to receive a command from a network instructing the mobile station to operate in event-based FANR mode, wherein the event-based FANR mode is defined as ACK/NACK information for a downlink data block is included in an uplink data block and transmitted if unreported ACK/NACK state for the downlink data block is detected in an instance of not receiving, from the network, a polling message requesting the transmission of ACK/NACK information;
   a processor configured to:
   determine whether there is at least one uplink data block to be transmitted; and
   if there is the at least one uplink data block to be transmitted, determine an ACK/NACK state for the at least one uplink data block to be transmitted; and
   a transmit module configured to transmit, if the processor determines that the ACK/NACK state is a tentative ACK state for the at least one uplink data block to be transmitted, an ACK/NACK signal for the downlink data block in an uplink control message in event-based FANR mode, instead of a transmission of the uplink data block including the ACK/NACK information for the downlink data block.

10. The mobile station of claim 9, wherein the transmit module is further configured to transmit an ACK/NACK signal for the downlink data block in an uplink data block, if the processor determines that the ACK/NACK state is not the tentative ACK state for the at least one uplink data block.

11. The mobile station of claim 10, wherein the transmit module is further configured to transmit the ACK/NACK signal for the downlink data block in a "piggyback" ACK/NACK field of the uplink data block, if the processor determines that the ACK/NACK state is not the tentative ACK state for the at least one uplink data block.

12. The mobile station of claim 9, wherein the at least one uplink data block and downlink data block are Radio Link Control data blocks.

13. The mobile station of claim 9, wherein the receive module is further configured to receive the polling message from the network requesting the transmission of ACK/NACK information; and the transmit module is further configured to transmit the ACK/NACK signal for the downlink data block in the uplink control message in response to the polling message.

14. The mobile station of claim 9, wherein the receive module is further configured to receive the downlink data block; the processor is further configured to detect the unreported ACK/NACK state for the downlink data block; and the transmit module is further configured to transmit the ACK/NACK signal for the downlink data block in the uplink control message in response to the unreported ACK/NACK state instead of a transmission of the uplink data block including the ACK/NACK information for the downlink data block.

15. The mobile station of claim 9, wherein the uplink control message is an EGPRS Packet Downlink ACK/NACK message.

16. The mobile station of claim 15, wherein the uplink control message is an EGPRS Packet Downlink ACK/NACK Type 2 message.

* * * * *